United States Patent [19]

Fujii et al.

[11] 4,361,462
[45] Nov. 30, 1982

[54] METHOD AND APPARATUS FOR REMOVING VOLATILE MATTER FROM HIGHLY VISCOUS MATERIAL

[75] Inventors: Yuji Fujii; Chikao Oda, both of Kudamatsu, Japan

[73] Assignee: Hitachi, Ltd., Tokyo, Japan

[21] Appl. No.: 268,999

[22] PCT Filed: Aug. 12, 1980

[86] PCT No.: PCT/JP80/00181

§ 371 Date: May 20, 1981

§ 102(e) Date: May 20, 1981

[87] PCT Pub. No.: WO81/00814

PCT Pub. Date: Apr. 2, 1981

[30] Foreign Application Priority Data

Sep. 21, 1979 [JP] Japan ................................ 54-120626

[51] Int. Cl.³ .............................................. B01D 1/22
[52] U.S. Cl. ...................................... 159/6 W; 159/49
[58] Field of Search .............. 159/5, 6 W, 6 WH, 9 R, 159/9 A, 10, 49, 2 E; 203/89; 126/247; 122/26

[56] References Cited

U.S. PATENT DOCUMENTS 2,520,729  8/1950  Kollsman ............................. 126/247
3,812,897  5/1974  Latinen ................................ 159/6 W

*Primary Examiner*—Frank Sever

*Attorney, Agent, or Firm*—Antonelli, Terry & Wands

[57] ABSTRACT

This invention relates to a method and apparatus for removing volatile matter such as solvents and monomers from highly viscous materials such as synthetic polymers by the use of a falling-film evaporator.

When a polymer composition containing a high concentration of the volatile matter, solvent and/or unreacted monomer, is preheated and then fed to a falling-film evaporator, the monomer reacts at a high temperature in the preheating, yielding its polymer of low molecular weight, and as a result the polymer quality deteriorates. When fed at a relatively low temperature, the polymer composition increases its viscosity with the vaporization of the solvent and/or monomer and becomes liable to partly solidify on account of the temperature drop due to the latent heat of vaporization, so that smooth treatment is difficult. This invention prevents the temperature drop as well as the reaction of the monomer, giving the polymer of high quality, by feeding the polymer composition of a relatively low temperature to a falling film evaporator and performing the heating of the polymer and the evaporation of the volatile matter simultaneously by supplying friction heat to the polymer composition within the clearances between the inner wall of the evaporator and the heating blades (19) attached to the outer ends of agitator blades (3), respectively.

5 Claims, 3 Drawing Figures

Explanation of Numbers in the Drawings

1 ------- Polymer composition inlet

2 ------- Distributor

3 ------- Agitator blade

4 ------- Jacket

5 ------- Evaporator body

6 ------- Heat medium inlet and outlet

7 ------- Bottom tank

8 ------- Discharge means

9 ------- Bottom bearing

10 ------ Vent

11 ------ Polymer outlet

12 ------ Stuffing box

13 ------ Rotary shaft 14, 15 -- Pulley

16 ------ Driving means

17 ------ Twisted blade

18 ------ Squeeze blade 19, 21-23 -- Heating blade

METHOD AND APPARATUS FOR REMOVING VOLATILE MATTER FROM HIGHLY VISCOUS MATERIAL

TECHNICAL FIELD

The present invention relates to a method and apparatus for removing volatile matter such as solvents and monomers from highly viscous materials like synthetic polymer compositions by the use of a falling-film evaporator.

BACKGROUND ART

In the continuous process of block or solution polymerization of styrene, the product polymer which is discharged from the polymerization reactor contains a high concentration of volatile matter, i.e., the monomer styrene or the solvent used for polymerization. A high-degree evacuation technique by the use of a vertical falling-film evaporator has been practiced to remove the volatile matter included in such a polymer composition.

In the conventional process employing this technique, the polymer composition is heated through a heater or heat exchanger in advance of the evaporation to offset the latent heat taken away by the evaporation. This method is, however, undesirable in point of polymer quality because the remaining monomer tends to form the polymer of low-molecular weight when exposed to high temperatures of the preheating. When the polymer composition of low temperature is fed to the evaporator, its viscosity increases with the vaporization of the solvent and/or monomer and it becomes liable to partly solidify on account of the temperature drop due to the vaporization, so that smooth revolution of the agitator becomes difficult.

DISCLOSURE OF INVENTION

This invention intends in particular to remove volatile matter such as a solvent and/or monomer from a highly viscous polymer composition by feeding the polymer composition of low temperature into a falling-film evaporator and performing the polymer heating and the evaporation of volatile matter simultaneously, wherein reaction of the monomer and the temperature drop due to vaporization are prevented and the operation is carried out smoothly. For this purpose each agitator blade of the evaporator is provided at the outer end with a heating blade so as to give a wide contact area between the heating blade and the falling film, and thereby the driving power for the agitator is partly converted to friction heat at a low agitator speed to keep the temperature of the falling film. In addition, the friction heat to be applied to the polymer composition is controlled by regulating the heating blade-falling film contact area, i.e., by employing the heating blades of a proper shape and area according to a given amount of the volatile matter to be evaporated, thus eliminating unnecessary, undesirable heating and improving evaporation efficiency.

BEST MODE FOR CARRYING OUT THE INVENTION

Figure 1:
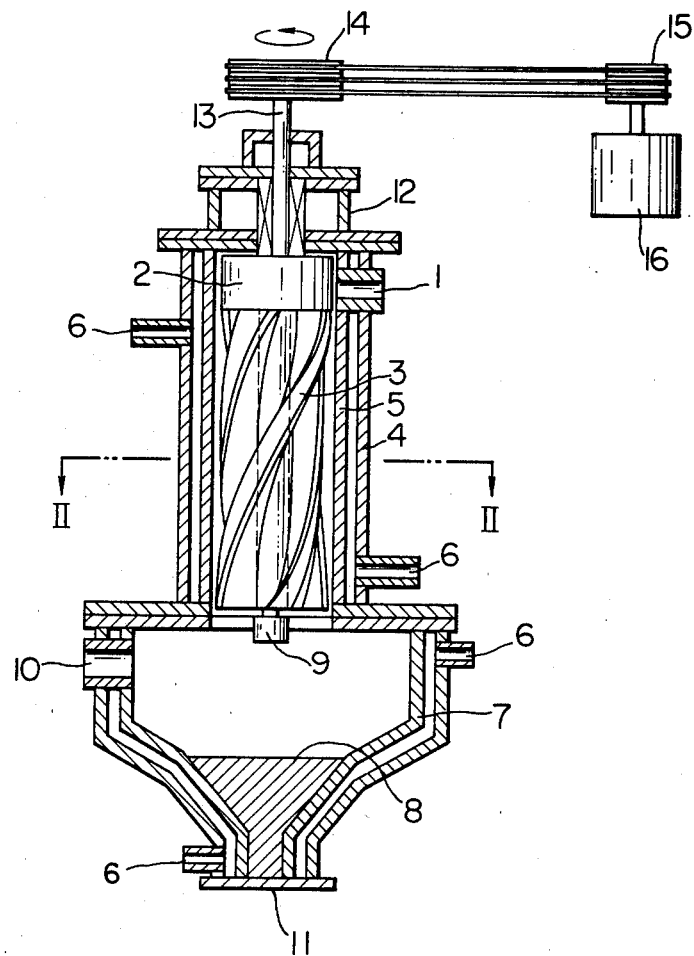
FIG. 1 is a vertical sectional view of a falling-film evaporator to represent a prefered embodiment of the invention.
Figure 2:
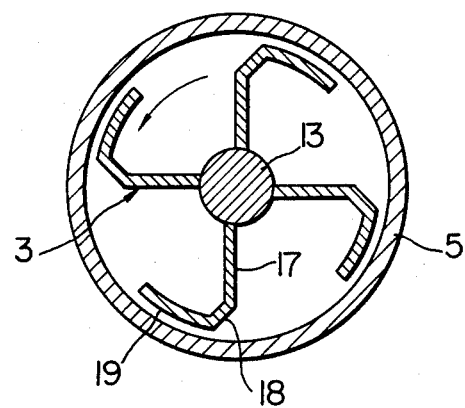
FIG. 2 is a cross-sectional view taken on line II—II of FIG. 1.
Figure 3:
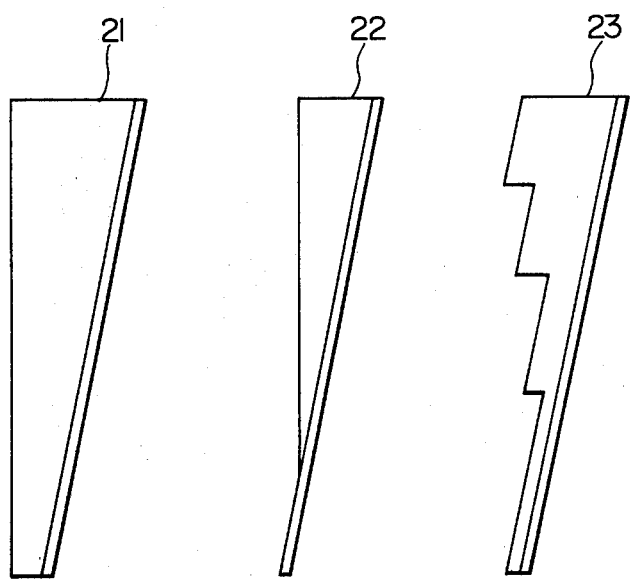
FIG. 3 is an elevation to illustrate preferred embodiments of the heating blade.

Referring now to FIGS. 1 to 3, there is illustrated an embodiment of the invention. FIG. 1 is a vertical sectional view of a falling-film evaporator for carrying out the invention, wherein 1 is a polymer composition inlet; 2 and 3 a distributor and agitator blades, respectively, all attached to a rotary shaft 13; 4 a heating jacket mounted around the evaporator body 5; 6 inlets and outlets for the heat medium; 7 a bottom tank of the evaporator 5; 8 a discharge means fitted within the bottom of the tank 7; 9 a bottom bearing for the rotary shaft 13; 10 a vent fitted into the upper wall of the bottom tank 7; 11 a polymer outlet located at the bottom of the tank 7; 12 a stuffing box; 14 and 15 pulleys; and 16 a driving means. FIG. 2 shows a horizontal cross-section of the agitator blades 3, which are assembled into a body through the rotary shaft 13 and each comprises a twisted blade 17 helically secured around the rotary shaft 13, a heating blade 19 having given widths in the direction of the agitator revolution and keeping a small clearance between its own face and the inner wall of the evaporator body 5, and a squeeze blade 18 being united with the twisted blade at the one end and to the heating blade at the other end, said squeeze blade serving to force the polymer falling film into the clearance between the heating blade and the inner wall of the evaporater.

When a polymer composition of a low temperature (140°–150° C.) equal to its polymerization temperature is fed through the polymer composition inlet 1 into the evaporator body 5, it is uniformly delivered onto the inner wall of the evaporator body 5 by the distributor 2, and extended to the form of thin film by the twisted blades 17 of the agitor blades 3. At the same time it is squeezed into the clearances between the heating blades 19 and the inner wall of the evaporator body 5, where it is supplied with the friction heat generated by the revolution of the heating blades 19 being in contact with the polymer composition. Meanwhile, the volatile matter included in the polymer composition evaporates.

Thus, while receiving heat and separating the volatile matter, the polymer composition falls down to the bottom tank 7 and then drawn out through the polymer outlet 11 by the discharge means 8. The evaporated volatile matter is exhausted through the vent 10.

FIG. 3 illustrates some embodiments of the heating blade of this invention. Heating blades 21 to 23 are designed to have the widths decreasing downward because in the upper region of the evaporator a large amount of the volatile matter evaporates and much friction heat and consequently a large surface area of the heating blades contacting with the polymer composition are necessary in order to prevent the temperature drop. In the lower region, where smaller amount of the volatile matter evaporates, friction heat is controlled to be less by reducing the width of each heating blade in order to prevent excess temperature rise which would cause the degradation of the resulting polymer's properties.

As mentioned above, this invention provides a method and apparatus for removing volatile matter from a highly viscous material by the use of a falling-film evaporator, wherein each agitator blade is provided at the outer end with a heating blade keeping a small clearance between its own face and the inner wall of the evaporator and having given widths in the direction of the agitator revolution, and the highly viscous material is heated by friction within said clearances. Thus, the method of this invention does not necessitate any heater or heat exchanger to preheat the highly viscous material before feeding it to the evaporator. Accordingly, when this invention is applied to the removal of a monomer from a polymer containing a small amount of this monomer, the reaction of the remaining monomer at higher temperatures can be prevented. According to this invention, unlike the preheating method, because the heat supply from the friction of the heating blades and the heat dissipation to the evaporated matter as latent heat of vaporization are effected at the same time, the heat supplied is immediately consumed as the heat of vaporization and the evaporation can therefore be operated at a set temperature by keeping this heat balance. The present method and apparatus can also improve the efficiency of heat transfer to the falling film, particularly when treating synthetic polymers, which have generally low heat conductivity, because the falling film is squeezed into a thinner film, which is heated at both sides by the heating medium in the jacket and the friction with the heating blades. Since the present apparatus is designed to heat the polymer by friction heat generated between the inner wall of the evaporator and the heating blades having given widths in the direction of the agitator revolution, sufficient heat can be supplied to the polymer at a low agitator speed by use of heating blades having a relatively large width as a whole, whereby the chain scission of the polymer, which will be caused by a high agitator speed, can be inhibited.

We claim:

1. A method for removing volatile matter from a highly viscous material by the use of a falling-film evaporator having an evaporator body with agitator blades rotatably mounted therein, comprising the steps of feeding a low temperature highly viscous material directly into the evaporator body, heating said material with friction heat in a small clearance located between a face of respective heating blades connected to an outer end of each of the agitator blades of the evaporator and an inner wall of the evaporator body, and simultaneously with said heating, evaporating said volatile matter.

2. A method of claim 1, wherein the amount of friction heat generated is made to decrease from the highly viscous material inlet side of the evaporator body toward the outlet side thereof.

3. A falling-film evaporator for removing volatile matter from a highly viscous material, comprising an evaporator body having agitator blades rotatably mounted therein, and means for eliminating the requirement for a preheater including heating blade means, with heating blades connected to an outer end of each of the agitator blades in a manner providing a small clearance between a face of each heating blade and an inner wall of the evaporator body, positioned and dimensioned for frictionally heating said highly viscous material.

4. A falling-film evaporator according to claim 3, wherein said face of each of said heating blades extends from the respective agitator blade to which it is connected in a direction opposite the direction in which said agitator blades are rotatable, and wherein a squeeze blade connects each heating blade to its respective agitator blade for squeezing the highly viscous material into the small clearance between said face of each heating blade and the inner wall of the evaporator body.

5. A falling-film evaporator of claim 3 or 4, wherein the width of each heating blade decreases in a direction extending from a highly viscous material inlet end of the evaporator body toward an outlet end thereof.

* * * * *